United States Patent
Wang et al.

(10) Patent No.: US 12,453,504 B2
(45) Date of Patent: Oct. 28, 2025

(54) FEW-SHOT ELECTROCARDIOGRAM (ECG) SIGNAL CLASSIFICATION METHOD BASED ON IMPROVED SIAMESE NETWORK

(71) Applicants: Qilu University of Technology (Shandong Academy of Sciences), Jinan (CN); SHANDONG COMPUTER SCIENCE CENTER (NATIONAL SUPERCOMPUTING CENTER IN JINAN), Jinan (CN)

(72) Inventors: Yinglong Wang, Jinan (CN); Mengyu Sun, Jinan (CN); Minglei Shu, Jinan (CN); Shuwang Zhou, Jinan (CN); Pengyao Xu, Jinan (CN); Zhaoyang Liu, Jinan (CN)

(73) Assignees: QILU UNIVERSITY OF TECHNOLOGY (SHANDONG ACADEMY OF SCIENCES), Jinan (CN); SHANDONG COMPUTER SCIENCE CENTER (NATIONAL SUPERCOMPUTING CENTER IN JINAN), Jinan (CN)

( * ) Notice: Subject to any disclaimer, the term of this patent is extended or adjusted under 35 U.S.C. 154(b) by 0 days.

(21) Appl. No.: 18/739,383

(22) Filed: Jun. 11, 2024

(65) Prior Publication Data
US 2025/0152072 A1 May 15, 2025

(30) Foreign Application Priority Data

Nov. 13, 2023 (CN) .......................... 202311498055.5

(51) Int. Cl.
*G16H 50/20* (2018.01)
*A61B 5/00* (2006.01)
*A61B 5/308* (2021.01)
*A61B 5/349* (2021.01)

(52) U.S. Cl.
CPC .............. *A61B 5/349* (2021.01); *A61B 5/308* (2021.01); *A61B 5/7203* (2013.01); *G16H 50/20* (2018.01)

(58) Field of Classification Search
None
See application file for complete search history.

(56) References Cited

U.S. PATENT DOCUMENTS

| 11,147,500 B2 * | 10/2021 | Li ......................... A61B 5/316 |
| 2020/0160980 A1 * | 5/2020 | Lyman .................. G06F 18/217 |
| 2021/0103814 A1 * | 4/2021 | Tsiligkaridis ............ G06N 3/08 |

OTHER PUBLICATIONS

Gupta et al. ("Similarity Learning based Few Shot Learning for ECG Time Series Classification," 2021 Digital Image Computing: Techniques and Applications (DICTA), Gold Coast, Australia, 2021, pp. 1-8) (Year: 2021).*

* cited by examiner

*Primary Examiner* — Christopher B Tokarczyk
(74) *Attorney, Agent, or Firm* — Bayramoglu Law Offices LLC

(57) ABSTRACT

A few-shot electrocardiogram (ECG) signal classification method based on an improved Siamese network is provided. The method constructs a CMP module as a sub-network of a Siamese network, and combines extracted local and global features to better analyze peak information such as position, amplitude, and offset, making a transformed feature vector more robust. In this way, the method improves the accuracy and stability of few-shot ECG signal classification.

9 Claims, 7 Drawing Sheets

FEW-SHOT ELECTROCARDIOGRAM (ECG) SIGNAL CLASSIFICATION METHOD BASED ON IMPROVED SIAMESE NETWORK

CROSS-REFERENCE TO THE RELATED APPLICATIONS

This application is based upon and claims priority to Chinese Patent Application No. 202311498055.5, filed on Nov. 13, 2023, the entire contents of which are incorporated herein by reference.

TECHNICAL FIELD

The present disclosure relates to the technical field of electrocardiogram (ECG) signal classification, and in particular to a few-shot ECG signal classification method based on an improved Siamese network.

BACKGROUND

In recent years, deep learning (DL)-based algorithm models have achieved unprecedented success in big data (BD) processing in the field of artificial intelligence (AI). However, due to the rarity and large individual differences of certain types of arrhythmias the acquired data is limited, which limits the generalization ability and accuracy of existing models. Few-shot learning is mainly used for neural network classifiers, which only requires a small number of samples for learning and training, and can achieve efficient recognition and classification of electrocardiogram (ECG) signals.

SUMMARY

In order to overcome the above-mentioned shortcomings in the prior art, the present disclosure provides a few-shot electrocardiogram (ECG) signal classification method based on an improved Siamese network, which can improve the classification accuracy.

In order to solve the technical problem, the present disclosure adopts the following technical solution.

The few-shot ECG signal classification method based on an improved Siamese network includes the following steps:

a) acquiring n original ECG signals to form an original ECG signal set D, D={$(x_1, y_1), (x_2, y_2), \ldots, (x_i, y_i), \ldots, (x_n, y_n)$}, where $x_i$ denotes an i-th original ECG signal, and $y_i$ denotes a class label corresponding to the i-th original ECG signal $x_i$, $i \in \{1, \ldots, n\}$;

b) preprocessing the original ECG signal set D to remove noise in the original ECG signals, thereby acquiring a clean ECG signal set D', D'={$(x'_1, y_1), (x'_2, y_2), \ldots, (x'_i, y_i), \ldots, (x'_n, y_n)$}, where $x'_i$ denotes an i-th clean ECG signal;

c) normalizing the i-th clean ECG signal $x'_i$ to acquire a normalized ECG signal $x''_i$; and performing zero-padding in the end of a sequence of the normalized ECG signal $x''_i$ if a length of the sequence of the normalized ECG signal $x''_i$ is less than $L_{max}$, such that the length of the sequence of the normalized ECG signal $x''$ is equal to $L_{max}$, thereby acquiring a normalized ECG signal set D", D"={$(x''_1, y''_1), (x''_2, y_2), \ldots, (x''_i, y_i), \ldots, (x''_n, y_n)$};

d) creating a sample pair set P based on the normalized ECG signal set D", $$P = \{((x''_1, x''_2), Y'), ((x''_2, x''_3), Y'), \ldots, ((x''_{i-1}, x''_i), Y'), ((x''_i, x''_{i+1}), Y'), \ldots, ((x''_{n-2}, x''_{n-1}), Y'), ((x''_{n-1}, x''_n), Y')\}, \text{ where}$$

$$Y' = \begin{cases} 1 & y_{i-1} = y_i \\ 0 & y_{i-1} \neq y_i \end{cases};$$

$y_{i-1}$ denotes a class label corresponding to the (i−1)-th original ECG signal $x_{i-1}$; and there are M sample pairs in the sample pair set P, $$M = \frac{n \times (n-1)}{2};$$

e) constructing a few-shot classification model, and inputting a sample pair ((x"$_i$, x"$_{i+1}$),Y') from the sample pair set P into the few-shot classification model to acquire a similarity score $E_w(x''_i, x''_{i+1})$;

f) training, by an adaptive moment estimation (Adam) optimizer, the few-shot classification model through a loss function L to acquire an optimized few-shot classification model;

g) randomly sampling K ECG signals from each of N classes in a Massachusetts Institute of Technology-Beth Israel Hospital (MIT-BIH) dataset to form a support set $S_{support}$, $S_{support}$={$(s_1, a_1), (s_2, a_2), \ldots, (s_i, a_i), \ldots, (s_{NK}, a_{NK})$}, where $s_i$ denotes an i-th ECG signal, and $a_i$ denotes a class label corresponding to the i-th ECG signal $s_i$, $i \in \{1, \ldots, NK\}$;

h) randomly sampling Q ECG signals from each of the N classes in the MIT-BIH dataset to form a query set $S_{query}$, $S_{query}$={$(q_1, b_1), (q_2, b_2), \ldots, (q_i, b_i), \ldots, (q_{NQ}, b_{NQ})$}, where $q_i$ denotes an i-th ECG signal, and $b_i$ denotes a class label corresponding to the i-th ECG signal $q_i$, $i \in \{1, \ldots, NQ\}$;

i) replacing the i-th original ECG signal $x_i$ with the i-th ECG signal $s_i$, and repeating the steps b) and c) to acquire an i-th normalized ECG signal s"$_i$, thereby acquiring a normalized support set S"$_{support}$, S"$_{support}$={(s"$_1$, a$_1$), (s"$_2$, a$_2$), …, (s"$_i$, a$_i$), …, (s"$_{NK}$, a$_{NK}$)}; and replacing the i-th original ECG signal $x_i$ with the i-th ECG signal $q_i$, and repeating the steps b) and c) to acquire an i-th normalized ECG signal q"$_i$, thereby acquiring a normalized query set S"$_{query}$, S"$_{query}$={(q"$_1$, b$_1$), (q"$_2$, b$_2$), …, (q"$_i$, b$_i$), …, (q"$_{NQ}$, b$_{NQ}$)}; and j) inputting the i-th normalized ECG signal s"$_i$ and the i-th normalized ECG signal q"$_i$ into the optimized few-shot classification model to acquire a classification result.

Further, the step a) includes: acquiring the n original ECG signals from a University of California Riverside (UCR) dataset.

Further, the step b) includes: denoising, by a first median filter and a second median filter in sequence, the i-th original ECG signal $x_i$ to acquire the i-th clean ECG signal $x'_i$.

Preferably, the first median filter has a width of 300 ms, and the second median filter has a width of 600 ms.

Preferably, $L_{max}$=187.

Further, the step e) includes:

e-1) constructing the few-shot classification model, including an embedding module and a metric module;

e-2) constructing the embedding module of the few-shot classification model, where the embedding module includes a Siamese network formed by a first CMP module and a second CMP module; the first CMP module includes a convolutional layer, a first rectified linear unit (ReLU) activation function layer, a primary capsule layer of a capsule network, a digital capsule layer of the capsule network, a first fully connected layer, a second ReLU activation function layer, and a second fully connected layer; and the second CMP module includes a convolutional layer, a first ReLU activation function layer, a primary capsule layer of a capsule network, a digital capsule layer of the capsule network, a first fully connected layer, a second ReLU activation function layer, and a second fully connected layer;

- e-3) inputting the i-th normalized ECG signal $x''_i$ into the convolutional layer and the first ReLU activation function layer of the first CMP module in sequence to acquire a feature $f_1^1$; inputting the feature $f_1^1$ into the primary capsule layer of the capsule network in the first CMP module to acquire a vector $f_1^2$; inputting the vector $f_1^2$ into the digital capsule layer of the capsule network in the first CMP module to acquire a feature $f_1^3$; inputting the feature $f_1^3$ into the first fully connected layer and the second ReLU activation function layer of the first CMP module in sequence to acquire a feature $f_1^4$; and inputting the feature $f_1^4$ into the second fully connected layer of the first CMP module to acquire a feature $f(x''_i)$;

- e-4) inputting the (i+1)-th normalized ECG signal $x''_{i+1}$ into the convolutional layer and the first ReLU activation function layer of the first CMP module in sequence to acquire a feature $f_2^1$; inputting the feature $f_2^1$ into the primary capsule layer of the capsule network in the first CMP module to acquire a vector $f_2^2$; inputting the vector $f_2^2$ into the digital capsule layer of the capsule network in the first CMP module to acquire a feature $f_2^3$; inputting the feature $f_2^3$ into the first fully connected layer and the second ReLU activation function layer of the first CMP module in sequence to acquire a feature $f_2^4$; and inputting the feature $f_2^4$ into the second fully connected layer of the first CMP module to acquire a feature $f(x''_{i+1})$; and

- e-5) inputting the feature $f(x''_i)$ and the feature $f(x''_{i+1})$ into the metric module of the few-shot classification model, and calculating the similarity score $E_w(x''_i, x''_{i+1})$ by $E_w(x''_i, x''_{i+1})=\|f(x''_i)-f(x''_{i+1})\|$, where $\|\cdot\|$ denotes a Euclidean distance (ED) calculation.

Preferably, in the step e-2), the convolutional layer of the first CMP module includes a 3×3 convolution kernel, and the convolutional layer of the second CMP module includes a 3×3 convolution kernel.

Further, the step f) includes: calculating the loss function L by $L = L_1 + \alpha L_2$, where $L_1 = Y' \frac{1}{2}(E_w(x''_i, x''_{i+1}))^2 + (1-Y')\{\max(0, m - E_w(x''_i, x''_{i+1}))\}^2$;

m denotes a hyperparameter, α denotes a hyperparameter; and $L_2$ denotes a cross entropy loss function.

Further, the step j) includes:

- j-1) inputting the i-th normalized ECG signal $s''_i$ of a u-th class into the convolutional layer and the first ReLU activation function layer of the first CMP module in sequence to acquire a feature $f_3^1$, $u \in \{1, \ldots, N\}$; inputting the feature $f_3^1$ into the primary capsule layer of the capsule network in the first CMP module to acquire a vector $f_3^2$; inputting the vector $f_3^2$ into the primary capsule layer of the capsule network in the first CMP module to acquire a feature $f_3^3$; inputting the feature $f_3^3$ into the first fully connected layer and the second ReLU activation function layer of the first CMP module in sequence to acquire a feature $f_3^4$; inputting the feature $f_3^4$ into the second fully connected layer of the first CMP module to acquire a feature $f(s''_i)_u$; and calculating, by a mean( ) function in Python, an average of all K features $f(s''_1)_u, f(s''_2)_u, \ldots, f(s''_i)_u, \ldots, f(s''_K)_u$, of the u-th class to acquire a feature vector $\mu_u$;

- j-2) inputting the i-th normalized ECG signal $q''_i$ into the convolutional layer and the first ReLU activation function layer of the first CMP module in sequence to acquire a feature $f_4^1$; inputting the feature $f_4^1$ into the primary capsule layer of the capsule network in the first CMP module to acquire a vector $f_4^2$; inputting the vector $f_4^2$ into the primary capsule layer of the capsule network in the first CMP module to acquire a feature $f_4^3$; inputting the feature $f_4^3$ into the first fully connected layer and the second ReLU activation function layer of the first CMP module in sequence to acquire a feature $f_4^4$; and inputting the feature $f_4^4$ into the second fully connected layer of the first CMP module to acquire a feature $f(q''_i)$;

- j-3) inputting the feature vector $\mu_u$ and the feature $f(q''_i)$ into the metric module of the few-shot classification model, and calculating the similarity score $E_w(\mu_u, f(q''_i))$ by $E_w(\mu_u, f(q''_i))=\|\mu_u-f(q''_i)\|$; and

- j-4) calculating a class label $\hat{y}_i$ of the i-th normalized ECG signal $q''_i$ by $\hat{y}_i=\arg \max \{E_w(\mu_1, f(q''_i)), E_w(\mu_2, f(q''_i)), \ldots, E_w(\mu_u, f(q''_i)), \ldots, E_w(\mu_N, f(q''_i))\}$, and combining class labels of all NQ normalized ECG signals to form the classification result.

The present disclosure has the following beneficial effects. The present disclosure constructs the CMP module as a sub-network of the Siamese network, and combines the extracted local and global features to better analyze peak information such as position, amplitude, and offset, making the transformed feature vector more robust. In this way, the present disclosure improves the accuracy and stability of few-shot ECG signal classification.

DETAILED DESCRIPTION OF THE EMBODIMENTS

Figure 1:
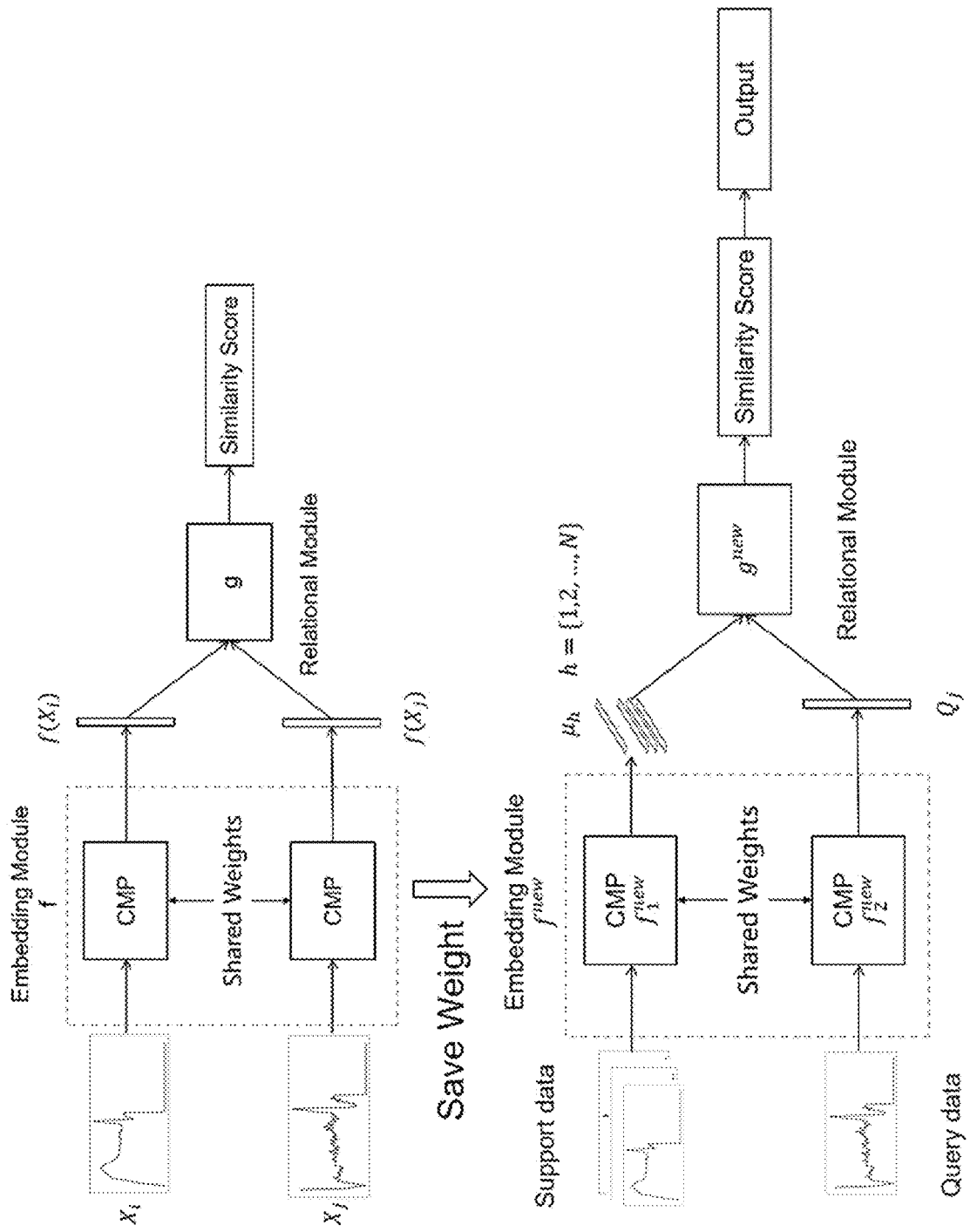
FIG. 1 is a flowchart of a few-shot ECG signal classification method based on an improved Siamese network according to the present disclosure.
Figure 2:
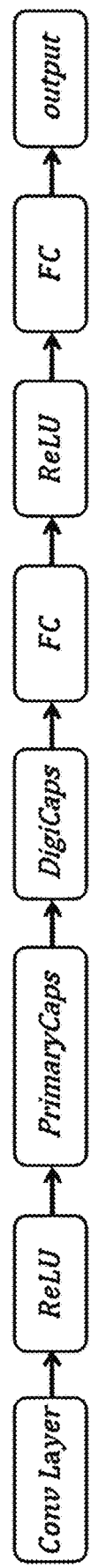
FIG. 2 is a structural diagram of a CMP module according to the present disclosure.

The present disclosure is further described with reference to FIG. 1 and FIG. 2.

The few-shot ECG signal classification method based on an improved Siamese network includes the following steps:

a) n original ECG signals are acquired to form original ECG signal set D, D={$(x_1, y_1), (x_2, y_2), \ldots, (x_i, y_i), \ldots, (x_n, y_n)$}, where $x_i$ denotes i-th original ECG signal, and $y_i$ denotes a class label corresponding to the i-th original ECG signal $x_i$, $i \in \{1, \ldots, n\}$.

b) The original ECG signal set D is preprocessed to remove noise in the original ECG signals, thereby acquiring clean ECG signal set D', D'={$(x'_1, y_1), (x'_2, y_2), \ldots, (x'_i, y_i), \ldots, (x'_n, y_n)$}, where $x'_i$ denotes i-th clean ECG signal.

c) The i-th clean ECG signal $x'_i$ is normalized to acquire normalized ECG signal $x''_i$; and performing zero-padding is performed in the end of a sequence of the normalized ECG signal $x''_i$ if a length of the sequence of the normalized ECG signal $x''_i$ is less than $L_{max}$, such that the length of the sequence of the normalized ECG signal $x''_i$ is equal to $L_{max}$, thereby acquiring normalized ECG signal set D", D"={$(x''_1, y_1), (x''_2, y_2), \ldots, (x''_i, y_i), \ldots, (x''_n, y_n)$}.

d) Sample pair set P is created based on the normalized ECG signal set D", $$P = \{((x''_1, x''_2), Y'), ((x''_2, x''_3), Y'), \ldots, ((x''_{i-1}, x''_i), Y'),$$
$$((x''_i, x''_{i+1}), Y'), \ldots, ((x''_{n-2}, x''_{n-1}), Y'), ((x''_{n-1}, x''_n), Y')\}, \text{where}$$

$$Y' = \begin{cases} 1 & y_{i-1} = y_i \\ 0 & y_{i-1} \neq y_i \end{cases};$$

$y_{i-1}$ denotes a class label corresponding to the (i−1)-th original ECG signal $x_{i-1}$; and there are M sample pairs in the sample pair set P, $$M = \frac{n \times (n-1)}{2}.$$

e) A few-shot classification model is constructed, and sample pair $(x''_i, x''_{i+1}), Y'$ from the sample pair set P is input into the few-shot classification model to acquire similarity score $E_w(x''_i, x''_{i+1})$ f) The few-shot classification model is trained by an adaptive moment estimation (Adam) optimizer through loss function L to acquire an optimized few-shot classification model.

g) K ECG signals are randomly sampled from each of N classes in a Massachusetts Institute of Technology-Beth Israel Hospital (MIT-BIH) dataset to form support set $S_{support}$, $S_{support}$={$(s_1, a_1), (s_2, a_2), \ldots, (s_i, a_i), \ldots, (s_{NK}, a_{NK})$}, where $s_i$ denotes i-th ECG signal, and $a_i$ denotes a class label corresponding to the i-th ECG signal $s_i$, $i \in \{1, \ldots, NK\}$.

h) Q ECG signals are randomly sampled from each of the N classes in the MIT-BIH dataset to form query set $S_{query}$ for the purpose of accurately classifying NQ queries based on given NK samples, $S_{query}$={$(q_1, b_1), (q_2, b_2), \ldots, (q_i, b_i), \ldots, (q_{NQ}, b_{NQ})$}, where $q_i$ denotes i-th ECG signal, and $b_i$ denotes a class label corresponding to the i-th ECG signal $q_i$, $i \in \{1, \ldots, NQ\}$.

i) The i-th original ECG signal $x_i$ is replaced with the i-th ECG signal $s_i$, and the steps b) and c) are repeated to acquire i-th normalized ECG signal $s''_i$, thereby acquiring normalized support set $S''_{support}$, $S''_{support}$={$(s''_1, a_1), (s''_2, a_2), \ldots, (s''_i, a_i), \ldots, (s''_{NK}, a_{NK})$}. The i-th original ECG signal $x_i$ is replaced with the i-th ECG signal $q_i$, and the steps b) and c) are repeated to acquire i-th normalized ECG signal $q''_i$, thereby acquiring normalized query set query $S''_{query}$, $S''_{query}$={$(q''_1, b_1), (q''_2, b_2), \ldots, (q''_i, b_i), \ldots, (q''_{NQ}, B_{NQ})$}.

j) The i-th normalized ECG signal $s''_i$ and the i-th normalized ECG signal $q''_i$ are input into the optimized few-shot classification model to acquire classification result.

The present disclosure provides a brand new CMP module to establish the Siamese network for few-shot ECG signal classification, which improves classification accuracy.

In an embodiment of the present disclosure, in the step a), the n original ECG signals are acquired from a University of California Riverside (UCR) dataset.

In an embodiment of the present disclosure, in the step b), the i-th original ECG signal $x_i$ is denoised by a first median filter and a second median filter in sequence to acquire the i-th clean ECG signal $x'_i$. In the embodiment, preferably, the first median filter has a width of 300 ms, and the second median filter has a width of 600 ms.

In an embodiment of the present disclosure, $L_{max}$=187.

In an embodiment of the present application, the step e) is as follows.

e-1) The few-shot classification model is constructed, including an embedding module and a metric module.

e-2) The embedding module of the few-shot classification model is constructed, where the embedding module includes a Siamese network formed by a first CMP module and a second CMP module; the first CMP module includes a convolutional layer, a first rectified linear unit (ReLU) activation function layer, a primary capsule layer of a capsule network, a digital capsule layer of the capsule network, a first fully connected layer, a second ReLU activation function layer, and a second fully connected layer; and the second CMP module includes a convolutional layer, a first ReLU activation function layer, a primary capsule layer of a capsule network, a digital capsule layer of the capsule network, a first fully connected layer, a second ReLU activation function layer, and a second fully connected layer.

e-3) The i-th normalized ECG signal $x''_i$ is input into the convolutional layer and the first ReLU activation function layer of the first CMP module in sequence to extract low-level feature of the ECG signal $x''_i$, thereby acquiring feature $f_1^1$. The feature $f_1^1$ is input into the primary capsule layer of the capsule network in the first CMP module for a feature-to-vector transformation, thereby acquiring vector $f_1^2$. The vector $f_1^2$ is input into the digital capsule layer of the capsule network in the first CMP module, and the vector $f_1^2$ is subjected to matrix transformation, input weighting, summation, and non-linear transformation to acquire feature $f_1^3$. The feature $f_1^3$ is input into the zero-neuron first fully connected layer and second ReLU activation function layer of the first CMP module in sequence for nonlinear mapping to acquire feature $f_1^4$. The feature $f_1^4$ is input into the second fully connected layer of the first CMP module, and an embedding vector mapped from the first fully connected layer to a 0-dimensional space outputs an embedding vector with a same dimension as an input dimension to acquire feature $f(x''_i)$.

e-4) The (i+1)-th normalized ECG signal $x''_{i+1}$ is input into the convolutional layer and the first ReLU activation function layer of the first CMP module in sequence to extract low-level feature of the ECG signal $x''_{i+1}$, thereby acquiring feature $f_2^1$. The feature $f_2^1$ is input into the primary capsule layer of the capsule network in the first CMP module for a feature-to-vector transformation, thereby acquiring vector $f_2^2$. The vector $f_2^2$ is input into the digital capsule layer of the capsule network in the first CMP module, and the vector $f_2^2$ is subjected to matrix transformation, input weighting, summation, and non-linear transformation to acquire feature $f_2^3$. The feature $f_2^3$ is input into the zero-neuron first fully connected layer and second ReLU activation function layer of the first CMP module in sequence for nonlinear mapping to acquire feature $f_2^4$. The feature $f_2^4$ is input into the second fully connected layer of the first CMP module, and an embedding vector mapped from the first fully connected layer to a 0-dimensional space outputs an embedding vector with a same dimension as an input dimension to acquire feature $f(x''_{i+1})$.

e-5) The feature $f(x''_i)$ and the feature $f(x''_{i+1})$ are input into the metric module of the few-shot classification model, and the similarity score is $E_w(x''_i, x''_{i+1})$ calculated by $E_w(x''_i, x''_{i+1}) = \|f(x''_i) - f(x''_{i+1})\|$, where $\|\cdot\|$ denotes a Euclidean distance (ED) calculation.

In the embodiment, in the step e-2), the convolutional layer of the first CMP module includes a 3×3 convolution kernel, and the convolutional layer of the second CMP module includes a 3×3 convolution kernel.

In the step f), the loss function L is calculated by $L = L_1 + \alpha L_2$, where $L_1$ is designed to adjust the loss function of the Siamese network.

$$L_1 = Y' \frac{1}{2}(E_w(x''_i, x''_{i+1}))^2 + (1 - Y')\{\max(0, m - E_w(x''_i, x''_{i+1}))\}^2,$$

where m denotes a hyperparameter; α denotes a hyperparameter; and $L_2$ denotes a cross entropy loss function. Further, α=5, m=5. The total loss L takes into account both sample distance and feature classification.

The step j) is as follows.

j-1) The i-th normalized ECG signal $s''_i$ of a W-th class is input into the convolutional layer and the first ReLU activation function layer of the first CMP module in sequence to acquire feature $f_3^1$, $u \in \{1, \ldots, N\}$. The feature $f_3^1$ is input into the primary capsule layer of the capsule network in the first CMP module to acquire vector $f_3^2$. The vector $f_3^2$ is input into the primary capsule layer of the capsule network in the first CMP module to acquire feature $f_3^3$. The feature $f_3^3$ is input into the first fully connected layer and the second ReLU activation function layer of the first CMP module in sequence to acquire feature $f_3^4$. The feature $f_3^4$ is input into the second fully connected layer of the first CMP module to acquire feature $f(s''_i)_u$. An average of all K features $f(s''_1)_u, f(s''_2)_u, \ldots, f(s''_i), \ldots, f(s''_K)_u$ of the W-th class is calculated by a mean( ) function in Python to acquire feature vector $\mu_u$.

j-2) The i-th normalized ECG signal $q''_i$ is input into the convolutional layer and the first ReLU activation function layer of the first CMP module in sequence to acquire feature $f_4^1$. The feature $f_4^1$ is input into the primary capsule layer of the capsule network in the first CMP module to acquire vector $f_4^2$. The vector $f_4^2$ is input into the primary capsule layer of the capsule network in the first CMP module to acquire feature $f_4^3$.

The feature $f_4^3$ is input into the first fully connected layer and the second ReLU activation function layer of the first CMP module in sequence to acquire feature $f_4^4$. The feature $f_4^4$ is input into the second fully connected layer of the first CMP module to acquire feature $f(q''_i)$.

j-3) The feature vector $\mu_u$ and the feature $f(q''_i)$ are input into the metric module of the few-shot classification model, and the similarity score is $E_w(\mu_u, f(q''_i))$ is calculated by $E_w(\mu_u, f(q''_i)) = \|\mu_u - f(q''_i)\|$.

j-4) Class label $\hat{y}_i$ of the i-th normalized ECG signal $q''_i$ is calculated by $\hat{y}_i = \arg\max \{E_w(\mu_1, f(q''_i)), E_w(\mu_2, f(q''_i)), \ldots, E_w(\mu_u, f(q''_i)), \ldots, E_w(\mu_N, f(q''_i))\}$, and class labels of all NQ normalized ECG signals are combined in to the classification result.

Taking the publicly available MIT-BIH dataset as an example, the implementation of the present disclosure is explained in detail below.

The model proposed by the present disclosure is compared with mainstream classification task models (ED, dynamic time warping (DTW), long short-term memory-fully connected network (LSTM-FCN)) and a Siamese convolutional neural network (SCNN) model, and the final accuracy is the average of 20 tasks. Accuracy, precision, recall, and F1 score are used as evaluation indicators.

Figure 3:
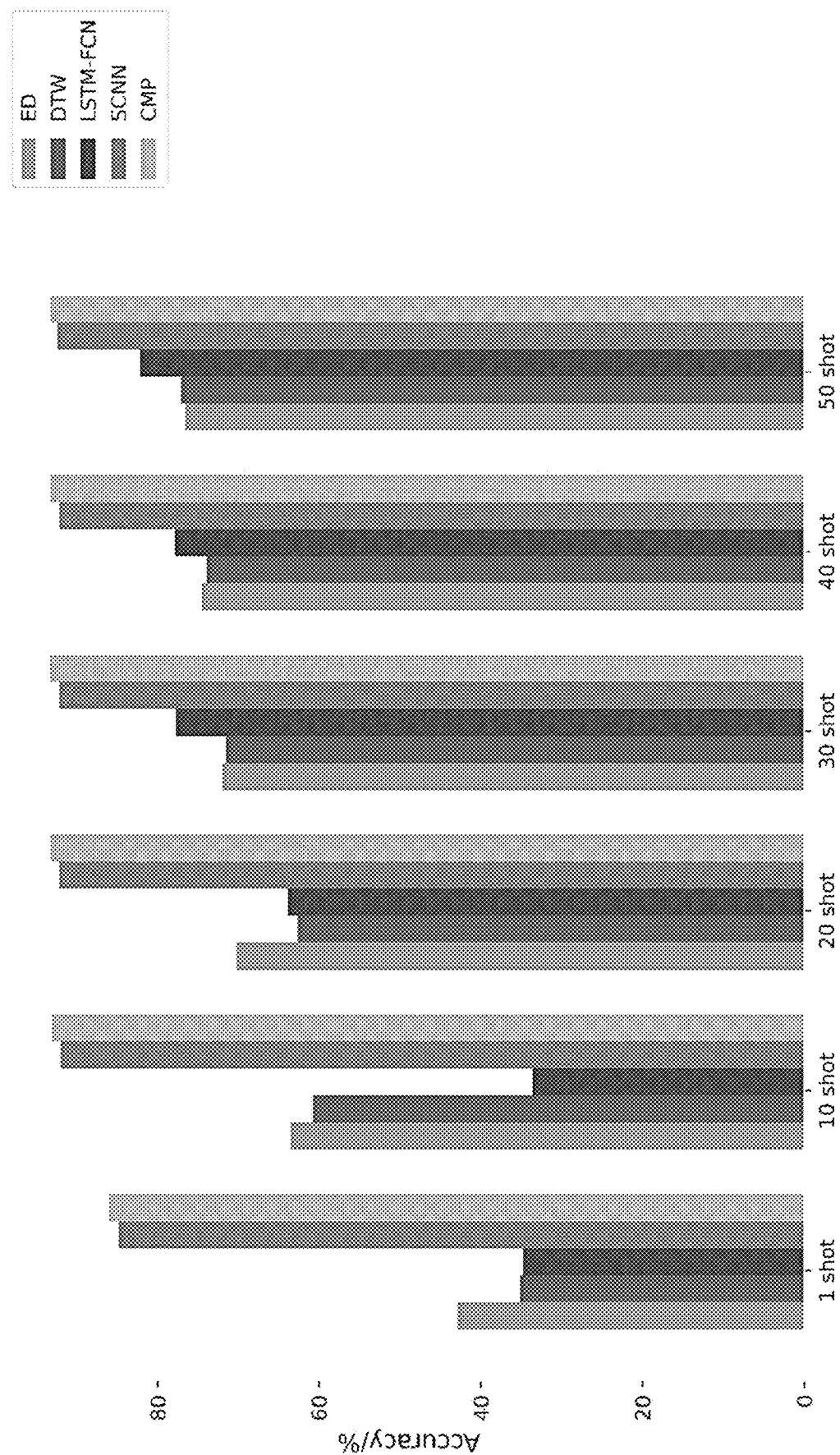
FIG. 3 shows a comparison of average accuracy and K for different models according to the present disclosure.

The training is performed based on UCR ECG200 and ECG5000 datasets, the validation is performed based on UCR TwoLeadECG and ECGFiveDays datasets, and the model testing is performed based on the MIT-BIH dataset. FIG. 3 shows a comparison of the relationship between the average accuracy and K for different models. It can be seen from the figure that as K increases, ED almost monotonically increases, and the precision, recall, and F1 score also increase. DTW does not follow such a smooth behavior and offers poorer performance than ED at a smaller K value. However, DTW outperforms ED at a value close to 50 and may perform better at a larger value. Unlike ED and DTW, FCN-LSTM exhibits an extremely irregular behavior during training, with a significant fluctuation in accuracy in certain areas, which can be attributed to the randomness of neural network optimization and the lack of labeled data for training. The comparison between the model of the present disclosure and the SCNN model shows that the accuracy does not increase sharply from K=1 to K=50, but tends to stabilize around 0.93, and the recall, precision, and F1 score also tend to stabilize around 0.93.

Figure 4B:
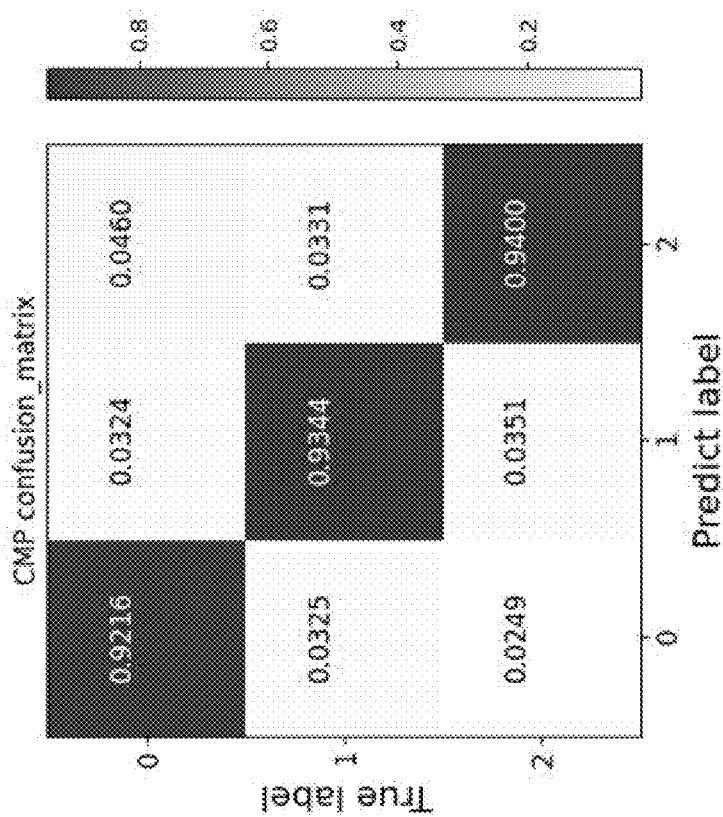
FIGS. 4A-4B show a comparison of confusion matrices for models in 3-way 10-shot according to the present disclosure.
Figure 4A:
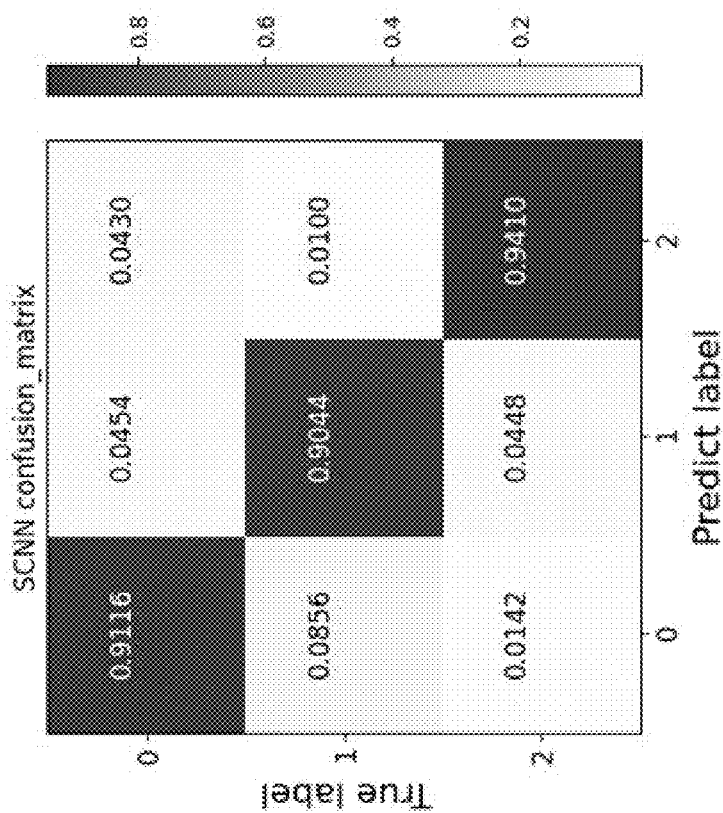
Figure 5B:
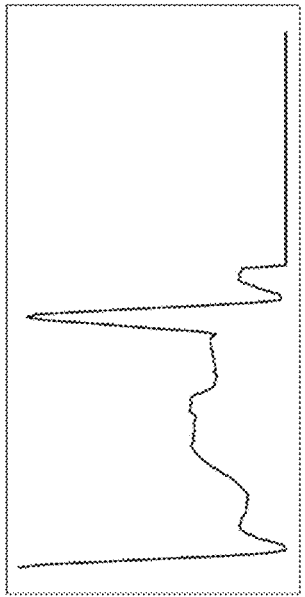
FIGS. 5A-5F show a comparison between true and predict labels in 3-way 10-shot.
Figure 5A:
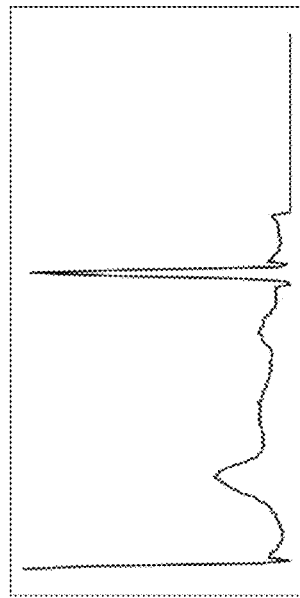
Figure 5C:
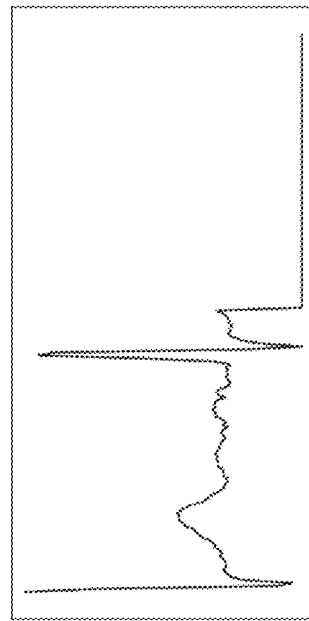
Figure 5D:
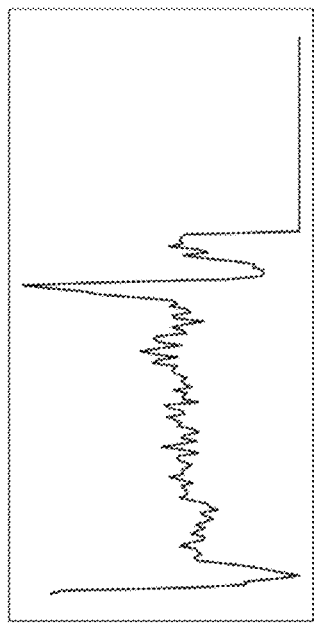
Figure 5F:
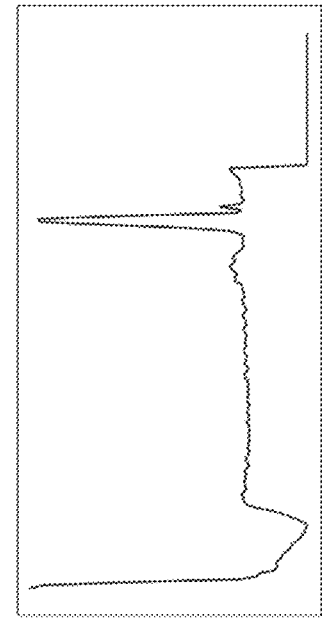
Figure 5E:
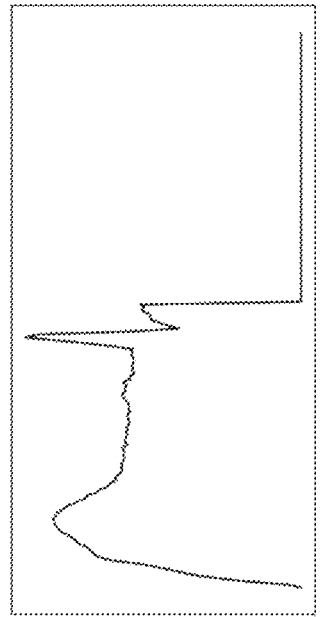

FIGS. 4A-4B show a confusion matrix of the CMP model in 3-way 10-shot on the MIT-BIH dataset. It can be seen from the figure that the model of the present disclosure has better comprehensive performance and lower misdiagnosis rate during the evaluation process. FIGS. 5A-5F show changes in true and predict labels of 6 randomly selected signals during 3-way 10-shot (N, S and V are represented by 0, 1 and 2, respectively). Table 1 shows comparison results of accuracy acquired by different models under different K values on the MIT-BIH dataset, while Table 2 shows comparison results of average precision, average recall, and average F1 score of different models on the MIT-BIH dataset. In summary, from the perspective of model performance, the model of the present disclosure can effectively distinguish between acceptable and unacceptable ECG signals in practical environments.

TABLE 1

Average accuracy comparison results of models in the present disclosure

| | Accuracy | | | | |
|---|---|---|---|---|---|
| K | ED | DTW | LSTM-FCN | SCNN | CMP |
| 1 | 0.4280 | 0.3505 | 0.3475 | 0.8475 | 0.8595 |
| 2 | 0.4835 | 0.4010 | 0.3375 | 0.9050 | 0.9145 |
| 3 | 0.5245 | 0.4600 | 0.3215 | 0.9195 | 0.9197 |
| 4 | 0.5535 | 0.5215 | 0.3220 | 0.9195 | 0.9215 |
| 5 | 0.5715 | 0.5495 | 0.3350 | 0.9225 | 0.9305 |
| 10 | 0.6340 | 0.6065 | 0.3355 | 0.9190 | 0.9320 |
| 20 | 0.7020 | 0.6255 | 0.6385 | 0.9205 | 0.9325 |
| 30 | 0.7190 | 0.7145 | 0.7765 | 0.9210 | 0.9327 |
| 40 | 0.7450 | 0.7390 | 0.7780 | 0.9210 | 0.9310 |
| 50 | 0.7645 | 0.7705 | 0.8215 | 0.9225 | 0.9319 |

TABLE 2

Average precision, average recall, and average F1 score comparison results of

| | Precision | | | | | Recall | | |
|---|---|---|---|---|---|---|---|---|
| K | ED | DTW | LSTM-FCN | SCNN | CMP | ED | DTW | LSTM-FCN |
| 1 | 0.446 | 0.414 | 0.569 | 0.857 | 0.859 | 0.428 | 0.351 | 0.348 |
| 2 | 0.499 | 0.445 | 0.616 | 0.909 | 0.913 | 0.484 | 0.401 | 0.338 |
| 3 | 0.536 | 0.515 | 0.629 | 0.923 | 0.924 | 0.525 | 0.460 | 0.322 |
| 4 | 0.557 | 0.537 | 0.632 | 0.924 | 0.927 | 0.554 | 0.522 | 0.322 |
| 5 | 0.569 | 0.554 | 0.643 | 0.926 | 0.930 | 0.572 | 0.549 | 0.335 |
| 10 | 0.632 | 0.616 | 0.658 | 0.923 | 0.939 | 0.634 | 0.607 | 0.336 |
| 20 | 0.704 | 0.628 | 0.736 | 0.924 | 0.939 | 0.702 | 0.626 | 0.639 |
| 30 | 0.720 | 0.721 | 0.794 | 0.925 | 0.939 | 0.719 | 0.715 | 0.777 |
| 40 | 0.746 | 0.739 | 0.803 | 0.925 | 0.937 | 0.745 | 0.739 | 0.778 |
| 50 | 0.768 | 0.775 | 0.832 | 0.926 | 0.937 | 0.765 | 0.771 | 0.822 |

| | Recall | | F1 Score | | | | |
|---|---|---|---|---|---|---|---|
| K | SCNN | CMP | ED | DTW | LSTM-FCN | SCNN | CMP |
| 1 | 0.848 | 0.854 | 0.437 | 0.379 | 0.432 | 0.852 | 0.854 |
| 2 | 0.905 | 0.911 | 0.492 | 0.442 | 0.436 | 0.907 | 0.913 |
| 3 | 0.919 | 0.920 | 0.530 | 0.486 | 0.425 | 0.921 | 0.929 |
| 4 | 0.919 | 0.919 | 0.555 | 0.529 | 0.427 | 0.922 | 0.922 |
| 5 | 0.923 | 0.928 | 0.570 | 0.552 | 0.441 | 0.924 | 0.921 |
| 10 | 0.919 | 0.933 | 0.633 | 0.611 | 0.445 | 0.921 | 0.933 |
| 20 | 0.921 | 0.935 | 0.703 | 0.627 | 0.684 | 0.923 | 0.934 |
| 30 | 0.921 | 0.936 | 0.720 | 0.718 | 0.785 | 0.923 | 0.934 |
| 40 | 0.922 | 0.937 | 0.746 | 0.739 | 0.796 | 0.923 | 0.933 |
| 50 | 0.923 | 0.933 | 0.766 | 0.773 | 0.827 | 0.924 | 0.933 |

Finally, it should be noted that the above descriptions are only preferred embodiments of the present disclosure, and are not intended to limit the present disclosure. Although the present disclosure has been described in detail with reference to the foregoing embodiments, those skilled in the art may still modify the technical solutions described in the foregoing embodiments, or equivalently substitute some technical features thereof. Any modification, equivalent substitution, improvement, etc. within the spirit and principles of the present disclosure shall fall within the scope of protection of the present disclosure.

What is claimed is:

1. A few-shot electrocardiogram (ECG) signal classification method based on an improved Siamese network, comprising the following steps:

a) acquiring n original ECG signals to form an original ECG signal set D, D={$(x_1, y_1), (x_2, y_2), \ldots, (x_i, y_i), \ldots, (x_n, y_n)$}, wherein $x_i$ denotes an i-th original ECG signal, and $y_i$ denotes a class label corresponding to the i-th original ECG signal $x_i$, $i \in \{1, \ldots, n\}$;

b) preprocessing the original ECG signal set D to remove noise in the n original ECG signals, thereby acquiring a clean ECG signal set D', D'={$(x'_1, y_1), (x'_2, y_2), \ldots, (x'_i, y_i), \ldots, (x'_n, y_n)$}, wherein $x'_i$ denotes an i-th clean ECG signal;

c) normalizing the i-th clean ECG signal $x'_i$ to acquire a normalized ECG signal $x''_i$; and performing zero-padding in an end of a sequence of the normalized ECG signal $x''_i$ if a length of the sequence of the normalized ECG signal $x''_i$ is less than $L_{max}$, wherein the length of the sequence of the normalized ECG signal $x''_i$ is equal to $L_{max}$, and a normalized ECG signal set D" is acquired, D"={$(x''_1, y_1), (x''_2, y_2), \ldots, (x''_i, y_i), \ldots, (x''_n, y_n)$};

d) creating a sample pair set P based on the normalized ECG signal set D", $$P = \{((x''_1, x''_2), Y'), ((x''_2, x''_3), Y'), \ldots, ((x''_{i-1}, x''_i), Y'),$$
$$((x''_i, x''_{i+1}), Y'), \ldots, ((x''_{n-2}, x''_{n-1}), Y'), ((x''_{n-1}, x''_n), Y')\}, \text{wherein}$$

$$Y' = \begin{cases} 1 & y_{i-1} = y_i \\ 0 & y_{i-1} \neq y_i \end{cases};$$

$y_{i-1}$ denotes a class label corresponding to an (i−1)-th original ECG signal $x_{i-1}$; and there are M sample pairs in the sample pair set P, $$M = \frac{n \times (n-1)}{2};$$

e) constructing a few-shot classification model, and inputting a sample pair $((x'_i, x'_{i+1}), Y')$ from the sample pair set P into the few-shot classification model to acquire a similarity score $E_w(x''_i, x''_{i+1})$;

f) training, by an adaptive moment estimation (Adam) optimizer, the few-shot classification model through a loss function L to acquire an optimized few-shot classification model;

g) randomly sampling K ECG signals from each of N classes in a Massachusetts Institute of Technology-Beth Israel Hospital (MIT-BIH) dataset to form a support set $S_{support}$, $S_{support}$={$(s_1, a_1), (s_2, a_2), \ldots, (s_i, a_i), \ldots, (s_{NK}, a_{NK})$}, wherein $S_i$ denotes an i-th ECG signal, and $a_i$ denotes a class label corresponding to the i-th ECG signal $s_i$, $i \in \{1, \ldots, NK\}$;

h) randomly sampling Q ECG signals from each of the N classes in the MIT-BIH dataset to form a set $S_{query}$, $S_{query}$={$(q_1, b_1), (q_2, b_2), \ldots, (q_i, b_i), \ldots, (q_{NQ}, b_{NQ})$}, wherein $q_i$ denotes an i-th ECG signal, and $b_i$ denotes a class label corresponding to the i-th ECG signal $q_i$, $i \in \{1, \ldots, NQ\}$;

i) replacing the i-th original ECG signal $x_i$ with the i-th ECG signal $s_i$, and repeating the steps b) and c) to acquire an i-th normalized ECG signal $s''_i$, wherein a normalized support set $S''_{support}$ is acquired, $S''_{support}$={$(s''_1, a_1), (s''_2, a_2), \ldots, (s''_i, a_i), \ldots, (s''_{NK}, a_{NK})$}; and replacing the i-th original ECG signal $x_i$ with the i-th ECG signal $q_i$, and repeating the steps b) and c) to acquire an i-th normalized ECG signal $q''_i$, a normalized query set $S''_{query}$ is acquired, $S''_{query}$={$(q''_1, b_1), (q''_2, b_2), \ldots, (q''_i, b_i), \ldots, (q''_{NQ}, b_{NQ})$}; and j) inputting the i-th normalized ECG signal $s''_i$ and the i-th normalized ECG signal $q''_i$ into the optimized few-shot classification model to acquire a classification result.

2. The few-shot ECG signal classification method based on the improved Siamese network according to claim 1, wherein the step a) comprises: acquiring the n original ECG signals from a University of California Riverside (UCR) dataset.

3. The few-shot ECG signal classification method based on the improved Siamese network according to claim 1, wherein the step b) comprises: denoising, by a first median filter and a second median filter in sequence, the i-th original ECG signal $x_i$ to acquire the i-th clean ECG signal $x'_i$.

4. The few-shot ECG signal classification method based on the improved Siamese network according to claim 3, wherein the first median filter has a width of 300 ms, and the second median filter has a width of 600 ms.

5. The few-shot ECG signal classification method based on the improved Siamese network according to claim 1, wherein $L_{max}=187$.

6. The few-shot ECG signal classification method based on the improved Siamese network according to claim 1, wherein the step e) comprises:
- e-1) constructing the few-shot classification model, comprising an embedding module and a metric module;
- e-2) constructing the embedding module of the few-shot classification model, wherein the embedding module comprises a Siamese network formed by a first CMP module and a second CMP module; the first CMP module comprises a convolutional layer, a first rectified linear unit (ReLU) activation function layer, a primary capsule layer of a capsule network, a digital capsule layer of the capsule network, a first fully connected layer, a second ReLU activation function layer, and a second fully connected layer; and the second CMP module comprises a convolutional layer, a first ReLU activation function layer, a primary capsule layer of a capsule network, a digital capsule layer of the capsule network, a first fully connected layer, a second ReLU activation function layer, and a second fully connected layer;
- e-3) inputting the i-th normalized ECG signal $x''_i$ into the convolutional layer and the first ReLU activation function layer of the first CMP module in sequence to acquire a feature $f_1^1$; inputting the feature $f_1^1$ into the primary capsule layer of the capsule network in the first CMP module to acquire a vector $f_1^2$; inputting the vector $f_1^2$ into the digital capsule layer of the capsule network in the first CMP module to acquire a feature $f_1^3$; inputting the feature $f_1^3$ into the first fully connected layer and the second ReLU activation function layer of the first CMP module in sequence to acquire a feature $f_1^4$; and inputting the feature $f_1^4$ into the second fully connected layer of the first CMP module to acquire a feature $f(x''_i)$;
- e-4) inputting an (i+1)-th normalized ECG signal $x''_{i+1}$ into the convolutional layer and the first ReLU activation function layer of the first CMP module in sequence to acquire a feature $f_2^1$; inputting the feature $f_2^1$ into the primary capsule layer of the capsule network in the first CMP module to acquire a vector $f_2^2$; inputting the vector $f_2^2$ into the digital capsule layer of the capsule network in the first CMP module to acquire a feature $f_2^3$; inputting the feature $f_2^3$ into the first fully connected layer and the second ReLU activation function layer of the first CMP module in sequence to acquire a feature $f_2^4$; and inputting the feature $f_2^4$ into the second fully connected layer of the first CMP module to acquire a feature $f(x''_{i+1})$; and
- e-5) inputting the feature $f(x''_i)$ and the feature $f(x''_{i+1})$ into the metric module of the few-shot classification model, and calculating the similarity score $E_w(x''_i, x''_{i+1})$ by $E_w(x''_i, x''_{i+1})=\|f(x''_i)-f(x''_{i+1})\|$, wherein $\|\cdot\|$ denotes a Euclidean distance (ED) calculation.

7. The few-shot ECG signal classification method based on the improved Siamese network according to claim 6, wherein in the step e-2), the convolutional layer of the first CMP module comprises a 3×3 convolution kernel, and the convolutional layer of the second CMP module comprises a 3×3 convolution kernel.

8. The few-shot ECG signal classification method based on the improved Siamese network according to claim 6, wherein the step j) comprises:
- j-1) inputting the i-th normalized ECG signal $s''_i$ of a u-th class into the convolutional layer and the first ReLU activation function layer of the first CMP module in sequence to acquire a feature $f_3^1$, $u \in \{1, \ldots, N\}$; inputting the feature $f_3^1$ into the primary capsule layer of the capsule network in the first CMP module to acquire a vector $f_3^2$; inputting the vector $f_3^2$ into the primary capsule layer of the capsule network in the first CMP module to acquire a feature $f_3^3$; inputting the feature $f_3^3$ into the first fully connected layer and the second ReLU activation function layer of the first CMP module in sequence to acquire a feature $f_3^4$; inputting the feature $f_3^4$ into the second fully connected layer of the first CMP module to acquire a feature $f(s''_i)_u$; and calculating, by a mean( ) function in Python, an average of all K features $f(s''_1)_u, f(s''_2)_u, \ldots, f(s''_i)_u, \ldots, f(s''_K)_u$, of the u-th class to acquire a feature vector $\mu_u$;
- j-2) inputting the i-th normalized ECG signal $q''_i$ into the convolutional layer and the first ReLU activation function layer of the first CMP module in sequence to acquire a feature $f_4^1$; inputting the feature $f_4^1$ into the primary capsule layer of the capsule network in the first CMP module to acquire a vector $f_4^2$; inputting the vector $f_4^2$ into the primary capsule layer of the capsule network in the first CMP module to acquire a feature $f_4^3$; inputting the feature $f_4^3$ into the first fully connected layer and the second ReLU activation function layer of the first CMP module in sequence to acquire a feature $f_4^4$; and inputting the feature $f_4^4$ into the second fully connected layer of the first CMP module to acquire a feature $f(q''_i)$;
- j-3) inputting the feature vector $\mu_u$ and the feature $f(q''_i)$ into the metric module of the few-shot classification model, and calculating the similarity score $E_w(\mu_u, f(q''_i))$ by $E_w(\mu_u, f(q''_i))=\|\mu_u-f(q''_i)\|$; and
- j-4) calculating a class label $\hat{y}_i$ of the i-th normalized ECG signal $q''_i$ by $\hat{y}_i=\arg\max\ \{E_w(\mu_1, f(q''_i)), E_w(\mu_2, f(q''_i)), \ldots, E_w(\mu_u, f(q''_i)), \ldots, E_w(\mu_N, f(q''_i))\}$, and combining class labels of all NQ normalized ECG signals to form the classification result.

9. The few-shot ECG signal classification method based on the improved Siamese network according to claim 1, wherein the step f) comprises: calculating the loss function L by, $L=L_1+\alpha L_2$, wherein $$L_1 = Y'\frac{1}{2}(E_w(x''_i, x''_{i+1}))^2 + (1-Y')\{\max(0, m-E_w(x''_i, x''_{i+1}))\}^2;$$

m denotes a hyperparameter, $\alpha$ denotes a hyperparameter; and $L_2$ denotes a cross entropy loss function.

* * * * *